United States Patent [19]
Takahashi

[11] Patent Number: 5,497,277
[45] Date of Patent: Mar. 5, 1996

[54] SPINDLE SYNCHRONIZATION CONTROLLER USING ADVANCE CALCULATION AND OFFSET VALUES

[75] Inventor: Eisaku Takahashi, Higashine, Japan

[73] Assignee: Fujitsu Limited, Kawasaki, Japan

[21] Appl. No.: 335,599

[22] Filed: Nov. 8, 1994

Related U.S. Application Data

[63] Continuation of Ser. No. 969,417, Oct. 30, 1992, abandoned.

[30] Foreign Application Priority Data

Oct. 31, 1991 [JP] Japan ................................ 3-285846

[51] Int. Cl.⁶ .................................................. G11B 15/46
[52] U.S. Cl. ...................... 360/73.03; 360/73.02
[58] Field of Search ............................ 360/73.03, 73.01, 360/73.02, 78.04

[56] References Cited

U.S. PATENT DOCUMENTS

| 4,879,608 | 11/1989 | Sano | 360/51 |
|---|---|---|---|
| 4,893,201 | 1/1990 | Emori et al. | 360/78.04 X |
| 4,907,105 | 3/1990 | Kurzweil, Jr. | 360/73.02 |
| 4,918,544 | 4/1990 | Ishizuka et al. | 360/73.03 |
| 5,249,254 | 9/1993 | Murphy et al. | 360/73.03 X |
| 5,276,569 | 1/1994 | Even | 360/73.03 X |

FOREIGN PATENT DOCUMENTS

| 60-236162 | 11/1985 | Japan . |
|---|---|---|
| 63-187462 | 8/1988 | Japan . |
| 142060 | 2/1989 | Japan . |
| 1236460 | 9/1989 | Japan . |
| 3252960 | 11/1991 | Japan . |

OTHER PUBLICATIONS

IBM Technical Disclosure Bulletin, vol. 33, No. 4, Sep. 1990, New York US, pp. 356–358, "Method to Synchronize Direct Access Storage Device Spindles Using Off–The–Shelf Hardware and Digital Control Techniques."

Primary Examiner—Aristotelis Psitos
Assistant Examiner—James L. Habermehl
Attorney, Agent, or Firm—Greer, Burns & Crain, Ltd.

[57] ABSTRACT

A spindle sync control system for a plurality of magnetic disk drives connected in parallel to a host computer. The system is capable of reducing lost time and preventing a system from going down. The system includes a discriminator (25A) for discriminating the presence or absence of a reference index, a medium index and a Hall index; an offset calculator (25B) for calculating an offset value between the medium, index and Hall index before starting spindle sync control; a memory means (26) for storing the thus calculated offset value; a phase difference calculator means (25C) for calculating a phase difference between the reference index and the medium index; and a determination means (25D) for determining a driving control value for rotating a spindle motor (7) according to the thus calculated phase difference.

7 Claims, 10 Drawing Sheets

SPINDLE SYNCHRONIZATION CONTROLLER USING ADVANCE CALCULATION AND OFFSET VALUES

This is a continuation of application Ser. No. 07/969,417, filed on Oct. 30, 1992, now abandoned.

BACKGROUND OF THE INVENTION

1. Field of the Invention

This invention relates to a spindle sync control for synchronously rotating individual spindle motors such as a plurality of magnetic disk drives connected in parallel to a host computer.

There is recently a tendency to demand, in a computer system, a transfer of large amounts of data at high speed, and therefore, storage drives such as magnetic disk drives are also required to transfer large amounts of data at high speed to exchange data with a host computer.

2. Description of the Related Art

In general, in a single unit of a magnetic disk drive, data transfer speed is limited by a rotation speed of a motor which rotates a magnetic disk as a recording medium. Accordingly, if it is intended to attain high speed operation by increasing a data transfer speed, it is necessary to perform read/write operations in parallel by driving a plurality of disk drives, called a disk array drive, simultaneously. At this time, according to a command from a host computer, the spindle motors of the magnetic disk drives such as disk array drives connected in parallel with the host computer are synchronously rotated, so that it becomes possible to perform a parallel transfer of data.

This function is generally referred to as a spindle sync.

The spindle sync is used to control a spindle motor so as to synchronize a reference index from a computer system with a medium index generated in a medium index generating circuit.

The reference index is a reference signal sent from the host computer to a magnetic disk to synchronize rotation of the disk medium. The medium index is a signal used to reproduce and generate an index stored in the disk medium and to conform with the above reference signal.

When a seeking data on a disk medium by moving a magnetic head for a read/write operation on the magnetic disk, if a normal seek cannot be achieved due to a disturbance or flaws on the disk medium, a seek error occurs and the magnetic disk drive enters into a rare uncontrolled status in which it is not certain where the magnetic head is located. Due this seek error, if the medium index becomes abnormal, the drive per se goes out of control, and thus the spindle sync function becomes abnormal. Accordingly, a spindle control system is required which is capable of carrying out the spindle sync normally even in the event of an occurrence of an error such as a seek error.

As a conventional spindle sync control system, there is one as shown in FIGS. 1 and 2, for example.

In FIG. 2, indicated at IA is a reference index which is sent from the host computer to the magnetic disk drive. A count value corresponding to a generation timing of the reference index IA is stored in a reference index register of the magnetic disk drive.

Indicated at IB is a medium index which is generated in a medium index generating circuit in accordance with a servo signal from a servo head. A count value corresponding to a generation of the medium index IB is stored in a medium index register.

Indicated at a is the count value of the reference index IA stored in the reference index register, and at b is the count value of the medium index IB stored in the medium index register.

Further, indicated at A is one cycle of the reference index IA and the medium index IB, and at B is a half cycle of the reference index IA and the medium index IB. Indicated at D is an offset value of the medium index IB relative to the reference index IA, and at C is a phase difference between the reference index IA and the medium index IB.

A control value (PWM signal) is calculated and used in controlling the spindle motor with reference to a flow chart shown in FIG. 1.

In FIG. 1, in Step S1, when the count value a of the reference index IA is stored in the reference index register, the count value a is output to a MPU, which in turn discriminates the presence or absence of the reference index IA. If the reference index IA is present, Err is calculated by subtracting a from b in Step S2. Err is represented by D in FIG. 2, and is an offset value. The value Err is always a negative value because it is calculated using the expression (b−a).

In Step S3, it is discriminated whether an absolute value of Err is not smaller than the value B corresponding to the half cycle of the disk medium. When ABS (Err)<B, this routine proceeds to Step S8, where ABS denotes "absolute".

When ABS (Err)≧B, the value B corresponding to the half cycle is added to the value Err and the thus obtained value is set as a new value Err.

In Step S5, it is discriminated whether an absolute value of Err is not smaller than the value B. When ABS (Err)≧B, this routine proceeds to Step S3 after adding the value B to the value Err.

When ABS (Err)<B in Step S5, the value B is added to the value Err. In other words, the phase difference indicated at C in FIG. 2 is obtained.

Steps S3 to S7 show a process for determining whether the spindle motor should be accelerated or decelerated by comparing ABS (Err) with the value B. More specifically, the spindle motor is decelerated when ABS (Err)≧B, and accelerated when ABS (Err)<B. By this process, the control can be executed rapidly. It will be appreciated that the value Err does not become infinite because it is defined to be a negative value.

In Step S8, the value Err is added to a current value DEF for rotating the spindle motor at a fixed speed corresponding to the value A so as to determine the control value (PWM signal). The rotation of the spindle motor is controlled in accordance with the thus determined control value so as to cause the phase of the reference index to correspond with that of the medium index.

When the phase of the reference index corresponds with that of the medium index, the data can be written or read in or from a plurality of magnetic disk drives simultaneously.

As explained above, in the known spindle sync control system, control of a spindle motor is carried out based on a phase difference between the medium index and the reference index.

In this case, the medium index is produced from a servo signal for a servo head written in a record medium (disk), and therefore the spindle sync control can be attained under the condition where the servo signal is surely obtained. As mentioned before, however, if the servo signal for the servo head cannot be obtained due to a seek error (about one error occurs per $10^6$ seeks) caused by a disturbance or flaws on the disk medium and so on, the medium index cannot be generated normally. If the medium index cannot be generated normally, the spindle sync function also becomes abnormal, and thereby a spindle sync error occurs.

At the moment when the spindle sync error occurs, a certain rare phenomena happens in which the disk head goes out of control to reach erase zones at both ends of the disk medium. In order to recover from this state to a normal state, a return-to-zero (reset) operation is conducted so as to restart the spindle sync after the medium index generating circuit starts its operation normally. It takes 10 seconds or more to change from the reset-to-zero operation to the restart of the spindle sync and this becomes a factor in a system going down.

SUMMARY OF THE INVENTION

In view of the problem existing in the prior art, it is an object of the invention to provide a spindle sync control system capable of reducing lost time and preventing a system from going down.

A further object of the present invention is to provide a spindle sync control system which prevents magnetic heads from reaching an erase zone at the end of disks when a seeking error has occurred.

A still further object of the present invention is to provide a spindle sync control system in which restart of a spindle synchronous operation is not recessitated even though a seeking error has occurred.

To attain the above objects, in the spindle sync control system according to the present invention, a condition is established in which a reference index is provided as a reference signal from a host computer, a medium index is generated by reproducing each index recorded in each recording media, and a Hall index output from a spindle motor is used for detecting a phase change over time, and further, under the above condition, the system has a means for calculating an offset value in advance from the medium index and the Hall index before starting the spindle sync control and storing the thus calculated offset value, and a means for calculating a phase difference between the reference index and the medium index with reference to the thus stored offset value. Thus, the spindle sync control is carried out according to the thus determined driving control value.

According to the present invention, a note is made of the fact that the Hall index is a signal not generated by the record medium but by the spindle motor and thereby the Hall index can be input at all times. By the use of the Hall index, an offset value is calculated in advance. This enables continuous operation of the spindle sync, even if the medium index cannot be obtained due to an occurrence of an error such as a seek error, without being affected by the seek error.

BRIEF DESCRIPTION OF THE DRAWINGS

The above objects and features of the present invention will be more apparent from the following description of the preferred embodiments with reference to the accompanying drawings, wherein.

DESCRIPTION OF THE PREFERRED EMBODIMENTS

The embodiments of the present invention will be described next with reference to the related figures.

Figure 1:
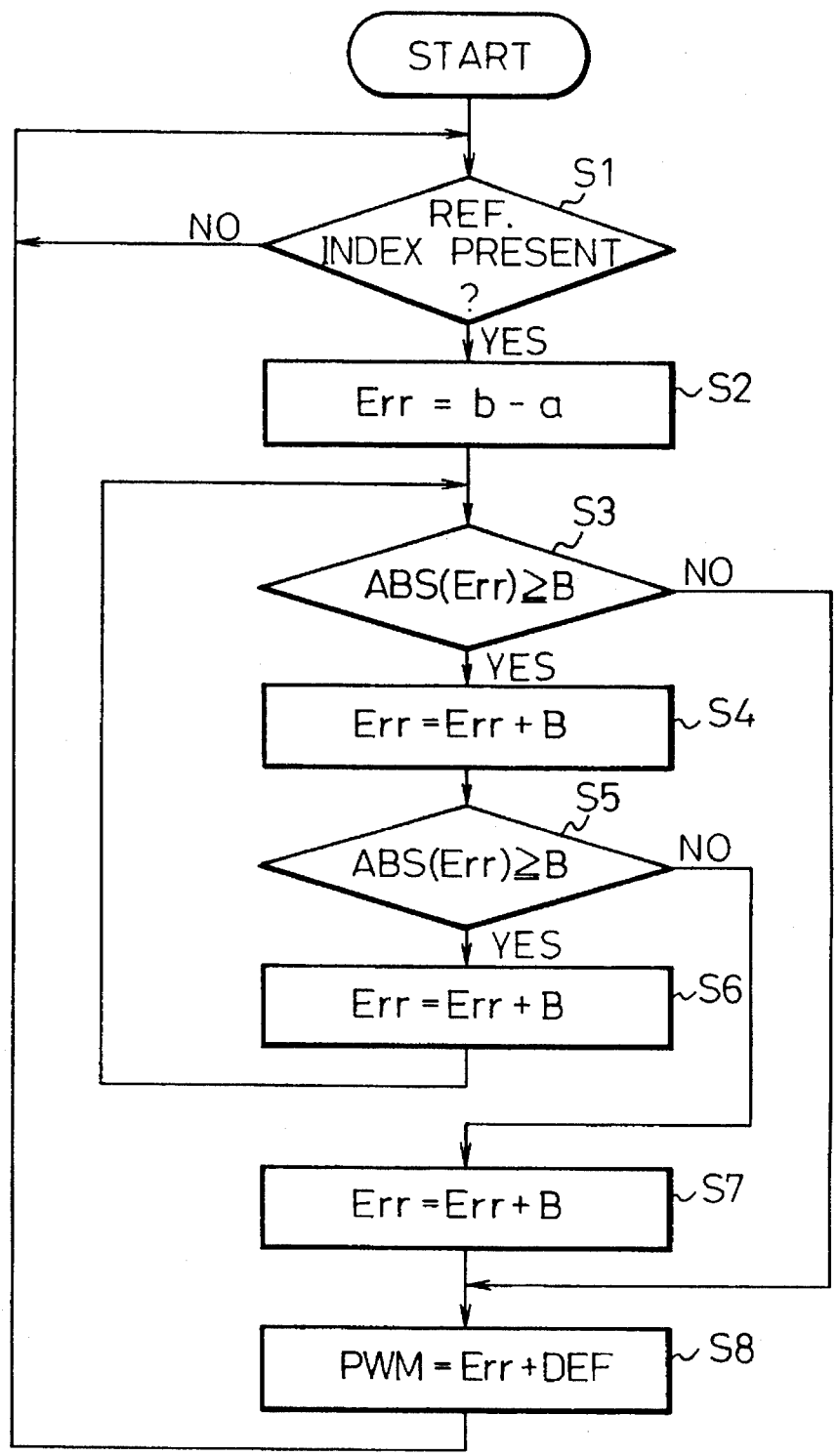
FIG. 1 is a flow chart showing an operation of the prior art.
Figure 2:
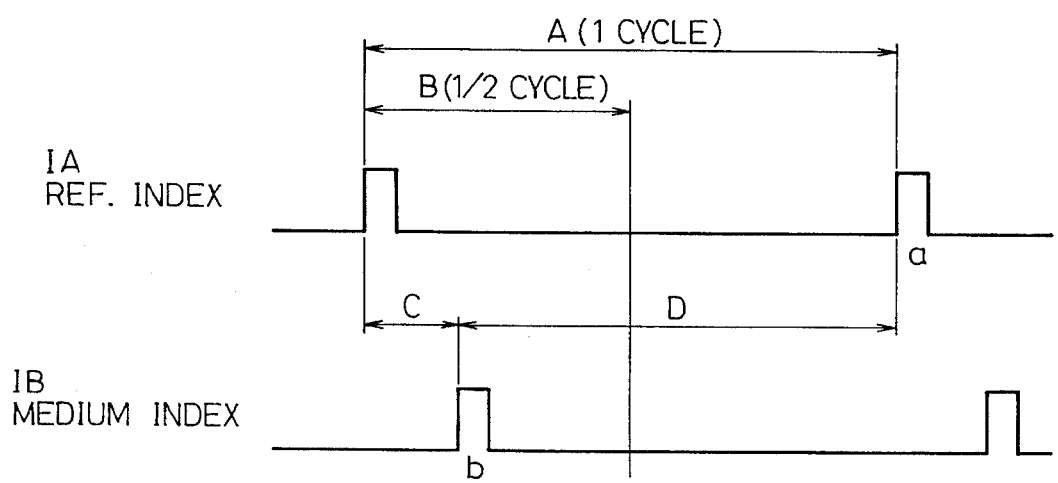
FIG. 2 is a diagram showing the phase difference between the reference index and the medium index.
Figure 3:
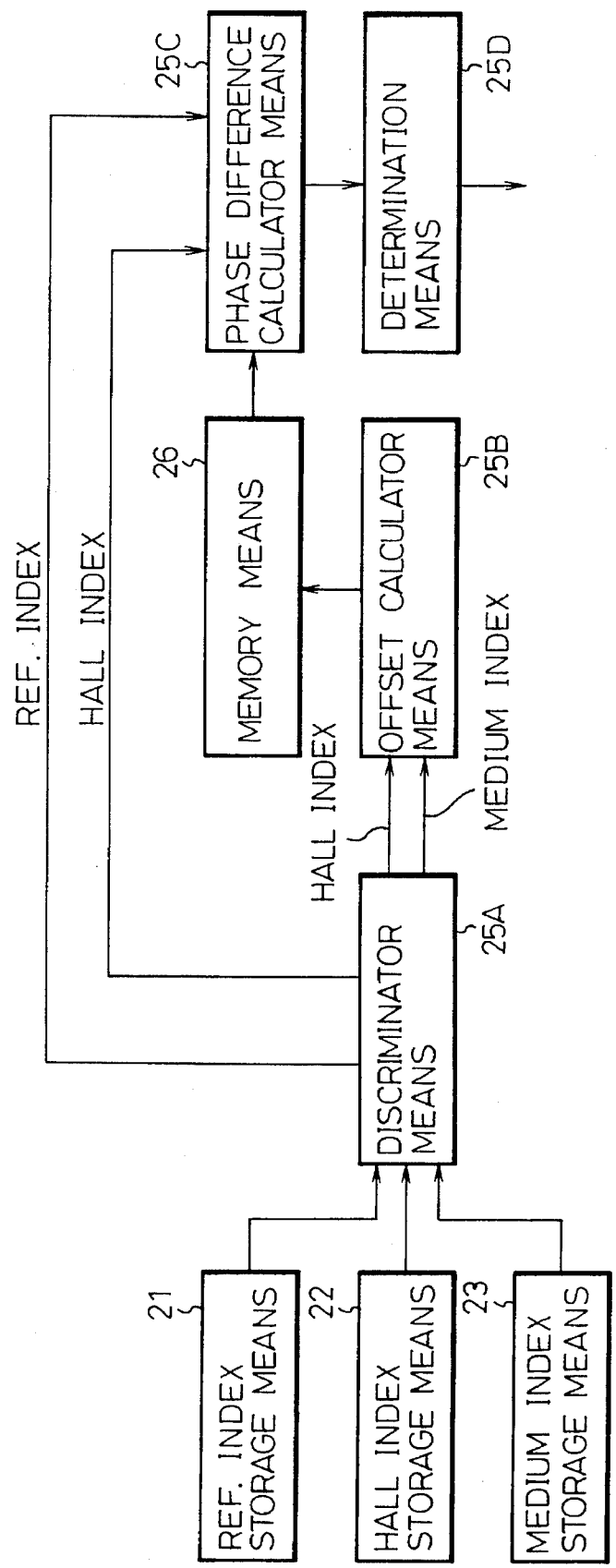
FIG. 3 is a diagram showing the principle of the invention.

FIG. 3 is a diagram showing the principle of the invention.

In FIG. 3, indicated at 21 is a reference index storage means for storing a count value corresponding to a generation timing of a reference index, at 22 a Hall index storage means for storing a count value corresponding to a generation timing of a Hall index, at 23 a medium index storage means for storing a count value corresponding to a generation timing of a medium index, at 25A a discriminator means for discriminating the presence or absence of the medium index, the Hall index, and the reference index, at 25B an offset calculator means for calculating an offset value of the medium index relative to the Hall index before the spindle sync is started, at 26 a memory means for storing the calculated offset value, at 25C a phase difference calculator means for calculating the phase difference between the reference index and the medium index with reference to the offset value, and at 25D a determination means for determining a drive control value for a spindle motor based on the thus calculated phase difference.

According to the invention, the presence of the medium index and the Hall index is discriminated by the discriminator means, and the offset value of the medium index relative to the Hall index is calculated by the offset calculator means before the spindle sync is started. The obtained offset value is stored in the memory means.

Thereafter, the phase difference between the reference index and the medium index is calculated in a pseudo manner based on the phase difference between the reference index and the Hall index with reference to the stored offset value. The control value used in controlling the spindle motor is determined based on the thus calculated phase difference, and the spindle sync is controlled in accordance therewith.

The Hall index is a signal which is generated by the spindle motor, and can be always input. Accordingly, even if the medium index cannot be obtained due to an error such as a seek error, the operation of the spindle sink can be continued without being affected by the seek error or the like.

Thus, it is not necessary to restart the spindle sync even if a seek error occurs, thereby reducing a time loss and preventing the system from going down.

FIGS. 4 to 7 show the exemplary embodiment of the invention.

Figure 5:
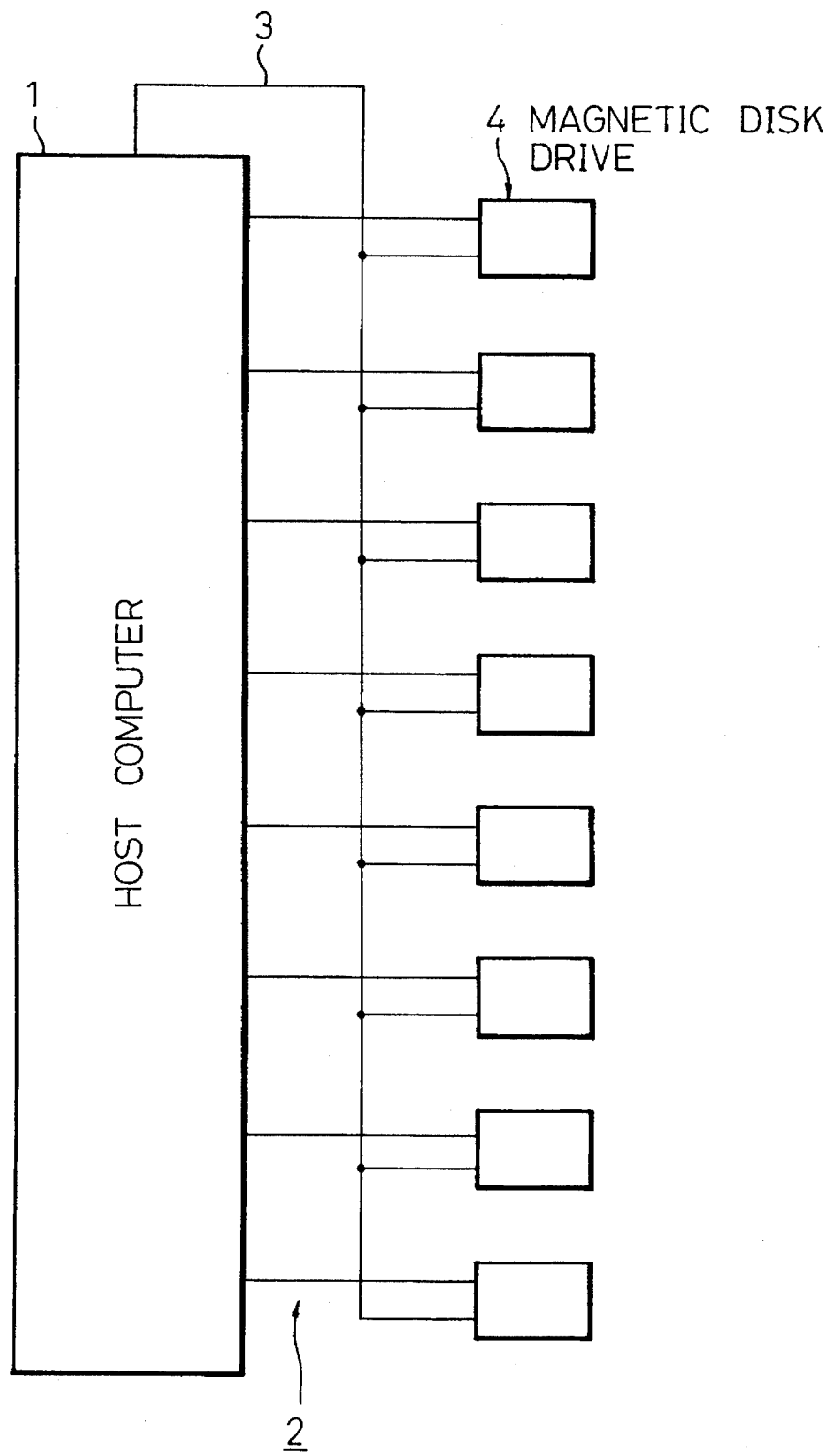
FIG. 5 is a diagram showing an overall construction of the invention.

In FIG. 5, indicated at 1 is a host computer to which a plurality, e.g., eight, of magnetic disk drives 4 are connected in parallel through signal lines 2 and a control line 3.

When the host computer 1 writes or reads data simultaneously in or from these magnetic disk drives 4, the data are transferred in parallel. This arrangement can satisfy a recent demand for a high speed data transfer.

The host computer 1 sends reference indices simultaneously to a plurality of magnetic disk drives 4 through the control line 3. The host computer 1 further provides spindle sync start commands simultaneously to the magnetic disk drives 4 through the signal lines 2.

Figure 4:
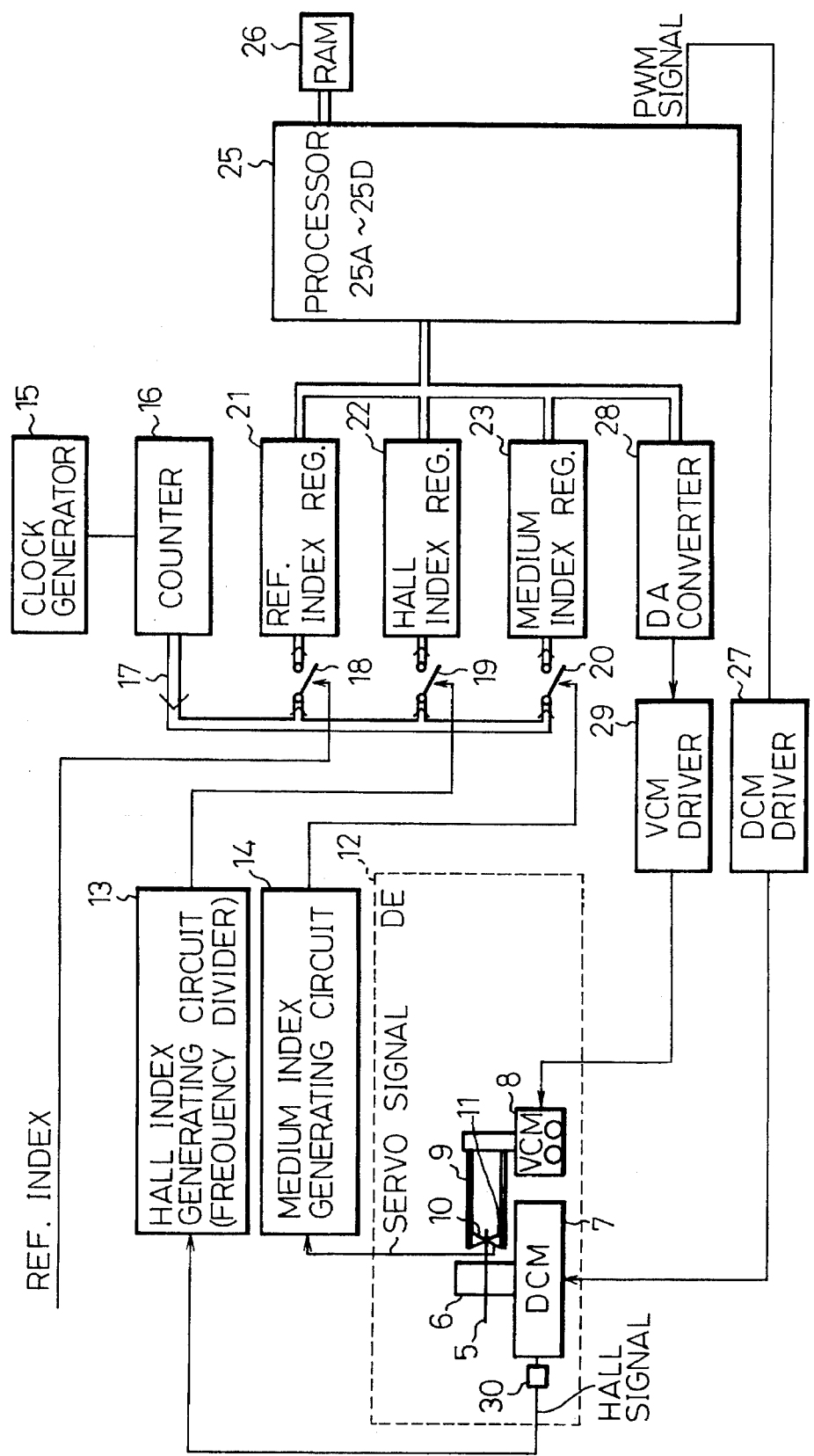
FIG. 4 is a diagram showing an exemplary embodiment of the invention.

FIG. 4 is a diagram showing an interior construction of each of the magnetic disk devices.

In FIG. 4, indicated at 5 is a disk serving as a storage medium. The disk 5 is mounted on a spindle shaft 6, and is drivingly rotated by a spindle motor 7 together with the spindle shaft 6.

Figure 8:
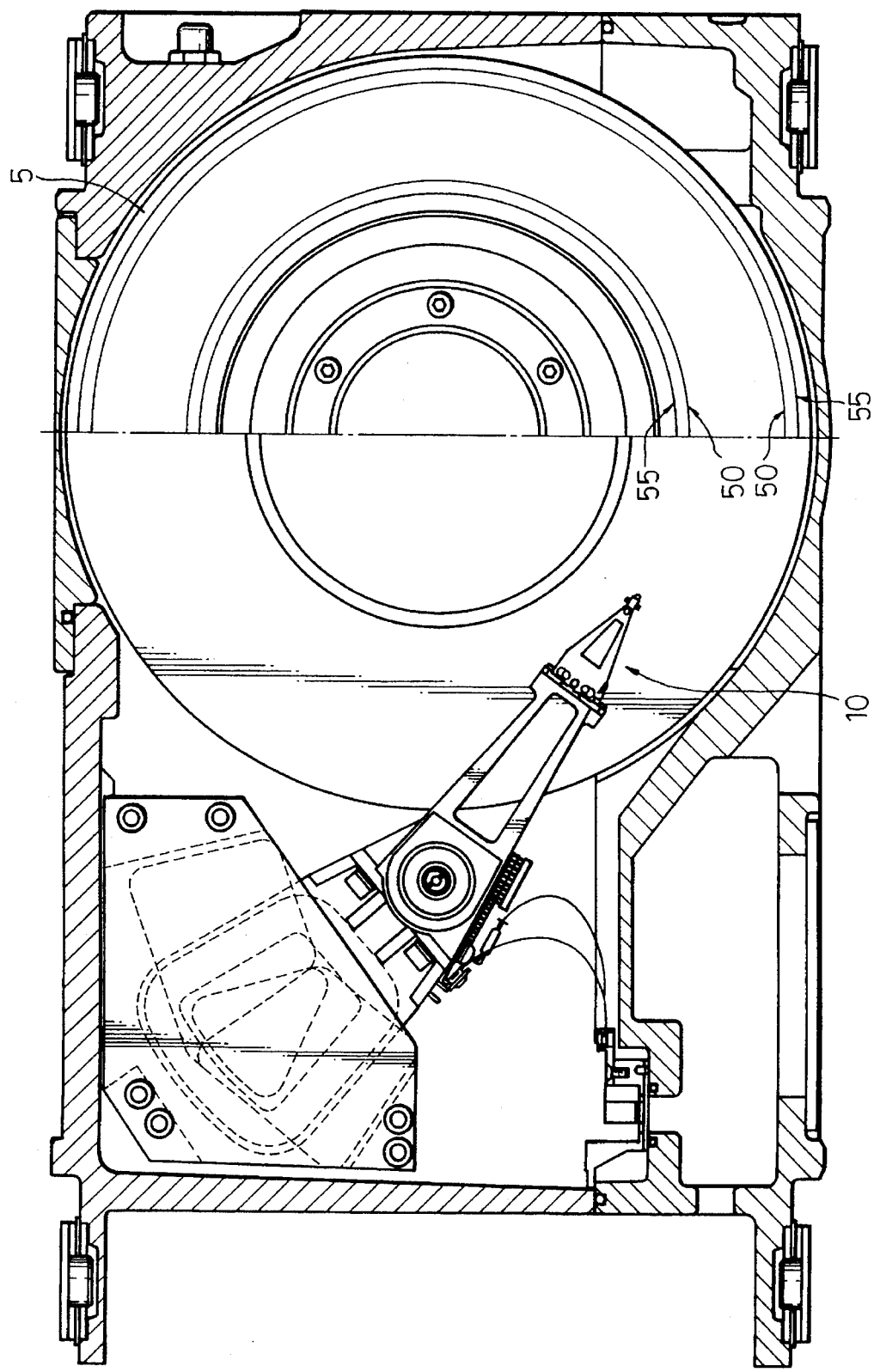
FIG. 8 is a partially sectional plan view showing a mechanism of a magnetic disk drive.
Figure 9:
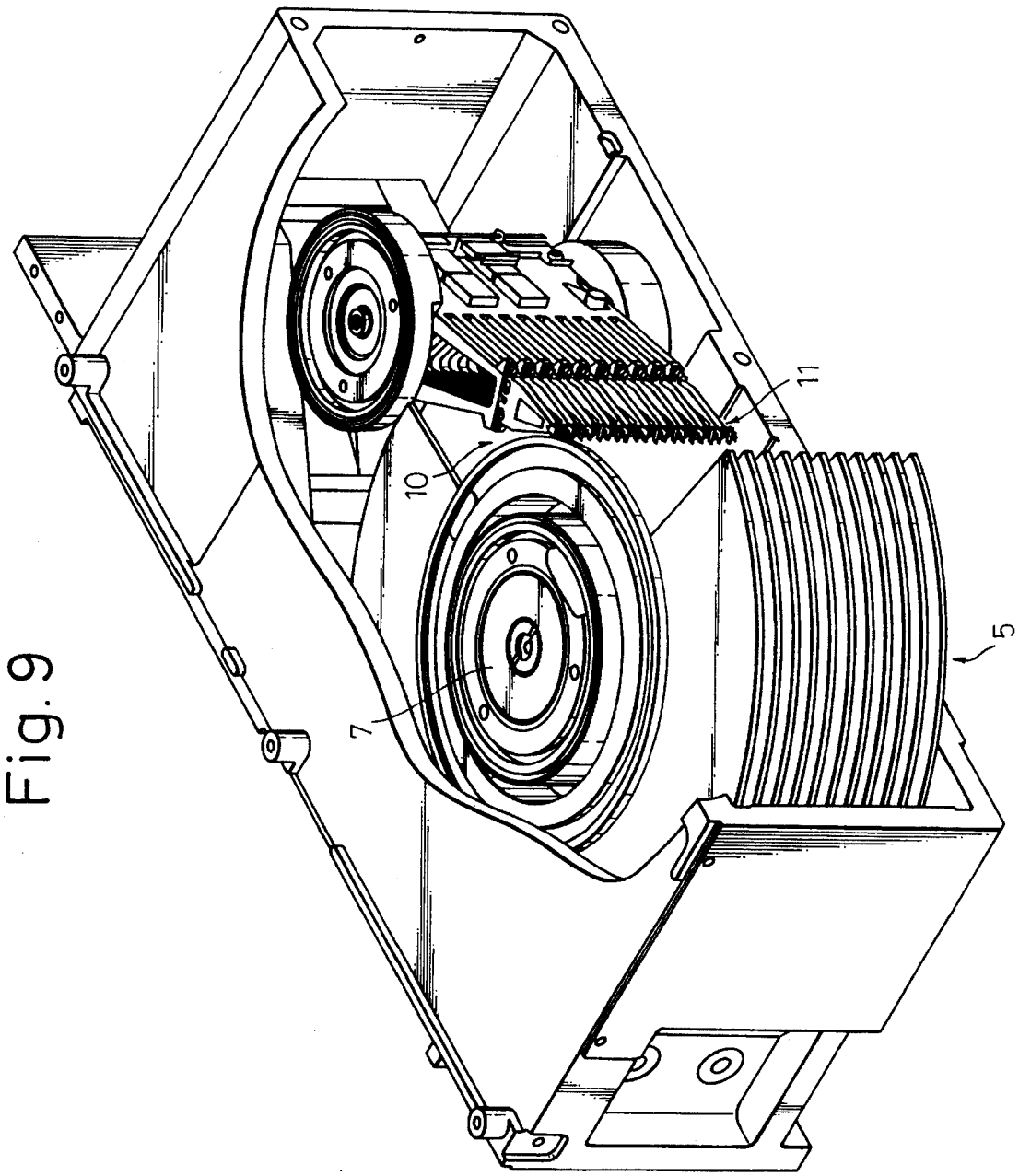
FIG. 9 is a perspective view, partially cut off, showing a mechanism of a magnetic disk drive.
Figure 10:
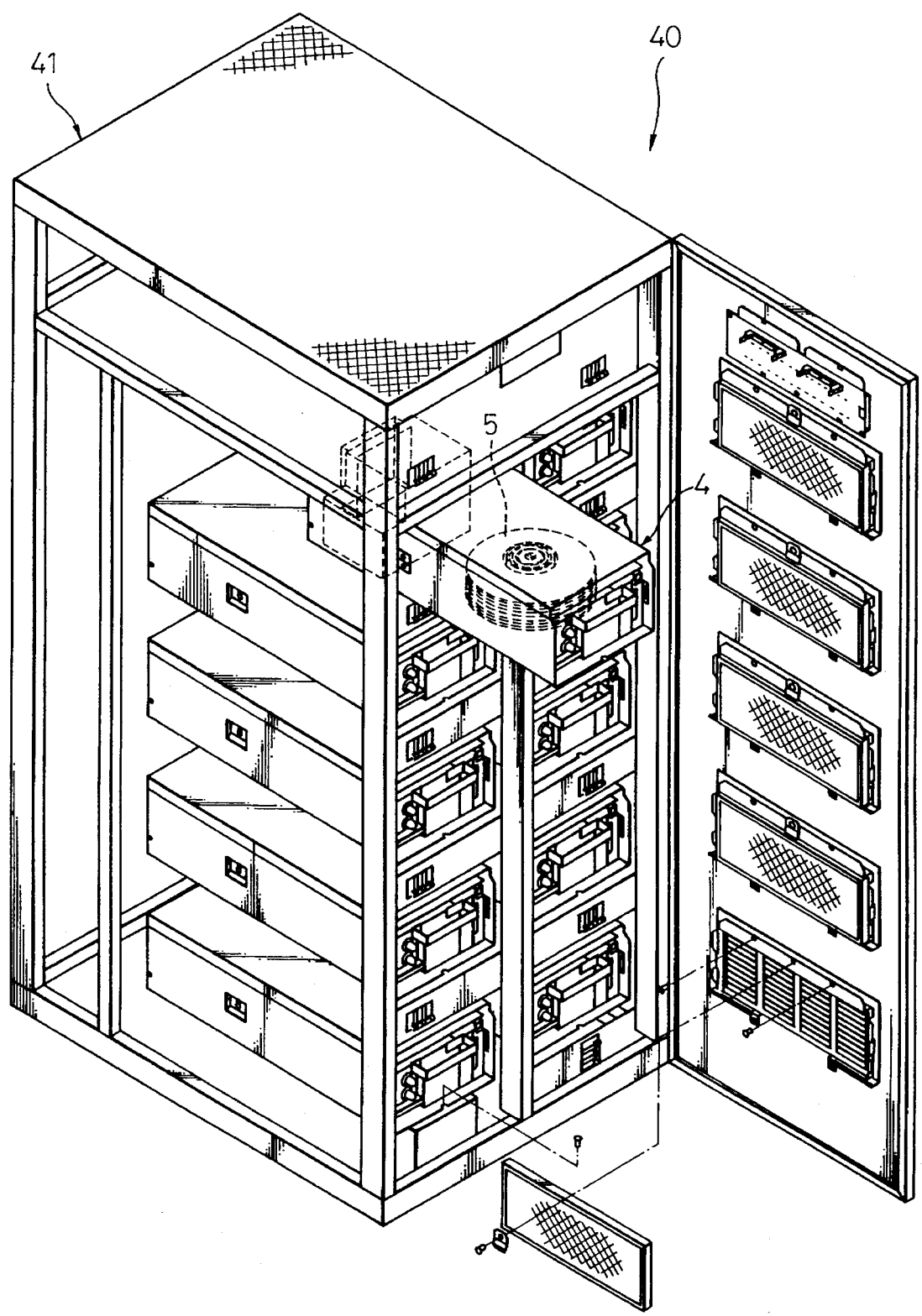
FIG. 10 is a perspective view showing an overall disk array drive.

Here, in order to facilitate understanding of the embodiment according to the present invention, a partially sectional plan view showing a mechanism of a magnetic disk drive and a perspective view, partially cut off, showing a mechanism of a magnetic disk drive are respectively illustrated in FIGS. 8 and 9. As seen from these figures, a plurality of disks (e.g., eleven disks in FIG. 8) 5 are rotated simultaneously. The tracks on the recording surface of each disk 5 are written with a predetermined data pattern. However, the tracks at both ends of the inner zone and the outer zone of the disk 5 are formed as guard bands 50 in which a particular pattern is written, instead of a data pattern, this particular pattern being used for stopping a seek operation of two kinds of heads 10 and 11 which will be explained hereinafter. Further, at the inner and the outer sides of the guard band 50, an erase zone 55 (FIG. 8) is formed for mechanically stopping the heads 10 and 11. In this case, if the heads 10 and 11 are controlled normally as expected, these heads 10 and 11 cannot reach, across the guard band 50, the erase zone 55. However, as mentioned earlier, if a seek error occurs, the heads 10 and 11 are put into an uncontrolled the status, and thereby, there is a fear that these heads would ignore the guard band 50 to reach the erase zone 55. The present invention proposes a measure for overcoming this problem as will be described in detail hereinafter. Preferably, the present invention is adopted to a disk array drive 40 as shown in FIG. 10, wherein reference numeral 4 denotes a magnetic disk drive, 5 a disk and 41 a housing.

Returning to FIG. 4, the disk 5 includes a substrate, a thin film magnetic substance, a protective coat, etc. On the protective coat is applied lubricating oil such as a fluoro-liquid lubricant.

Indicated at 8 is a VCM carriage incorporating a voice coil motor. The VCM carriage 8 includes a plurality of head arms 9. At a leading end of the head arm 9 is mounted a read/write head 10. The read/write head 10 is controllably located by the VCM carriage 8, and writes or reads the data in or from the disk 5.

At a leaning ends of another head arm 9 is mounted one servo head 11 which outputs a servo signal.

The heads 10, 11 start or stop in unison. When the rotating speed of the disk 5 reaches a constant speed range of, e.g., 3600 to 5400 rpm, the heads 5 float 0.1 to 0.3 μm above the disk 5 on an air stream and thereby gaps are maintained between the disk 5 and the head 10, and between the disk 5 and the head 11.

Indicated at 12 is a disk enclosure (DE) functioning as a housing. In the disk enclosure 12 are contained the disk 5, the heads 10, 11, the spindle motor 7, the VCM carriage 8, etc. The interior of the disk enclosure is sealed.

Indicated at 13 is a Hall index generating circuit (frequency divider) which generates a Hall index in accordance with a Hall signal from a Hall device 30 provided at the spindle motor 7.

Indicated at 14 is a medium index generating circuit which generates a medium index in accordance with the servo signal from the servo head 11.

Indicated at 15 is a clock generator which generates clock pulses and applies the same to a counter 16.

The counter 16 carries out a counting operation in accordance with the clock pulses from the clock generator 15, and outputs a count value thereof to a bus 17.

When the reference index is output from the host computer 1, a switch 18 provided along the bus 17 is turned on and thereby the count value of the reference index output from the counter 16 is stored in a reference index register (reference index storage means) 21.

Further, when the Hall index is output from the Hall index generating circuit 13, a switch 19 is turned on and thereby the count value of the Hall index output from the counter 16 is stored in a Hall index register (Hall index storage means) 22.

Moreover, when the medium index is output from the medium index generating circuit 14, a switch 20 is turned on and thereby the count value of the medium index output from the counter 16 is stored in a medium index register (medium index storage means) 23.

The reference index register 21, the Hall index register 22, and the medium index register 23 are connected to a processor 25 through a bus 24. When the count values are stored, the respective registers output the stored count values to the processor 25.

The processor 25 includes a discriminator means 25A for discriminating the presence or absence of the medium index, the Hall index, and the reference index, an offset calculator means 25B for calculating an offset value of the medium index relative to the Hall index, a phase difference calculator means 25C for calculating the phase difference between the reference index and the medium index with reference to the offset value, and a determination means 25D for determining a drive control value for the spindle motor based on the calculated phase difference.

Indicated at 26 is a RAM serving as a memory means in which the offset value calculated in the processor 25 is stored.

The control value obtained in the processor 25 is output to a DCM driver 27 in the form of a PWM signal. The spindle motor 7 has the rotating speed thereof controlled through the DCM driver 27.

A seek command from the processor 25 is output through the bus 25 to a DA converter 28 in which the seek command is converted into an analog signal. The thus obtained analog signal is output to a VCM driver 29.

The VCM carriage 8 receives the seek command from the processor 25 through the VCM driver 29, and executes a control so as to locate the heads 10, 11.

An operation of the embodiment shown in FIG. 4 will be described next.

Figure 6A:
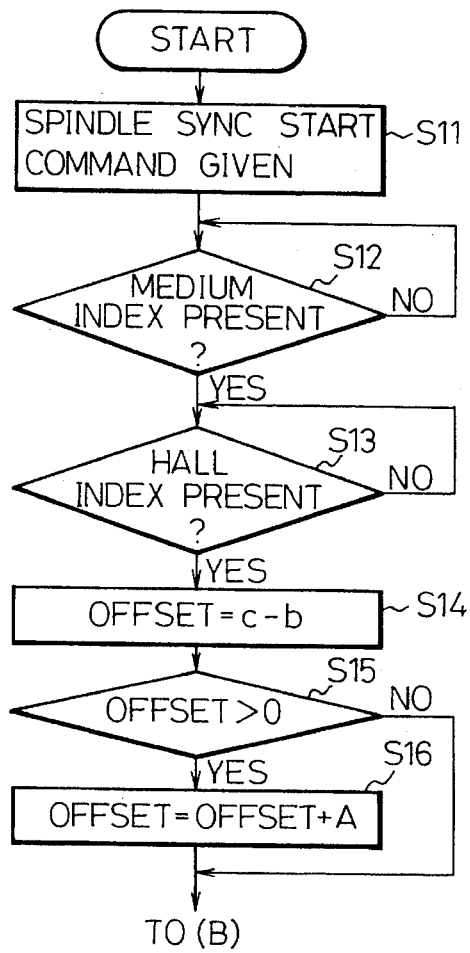
FIGS. 6(A) and 6(B) are flow charts showing an operation of the invention.
Figure 6B:
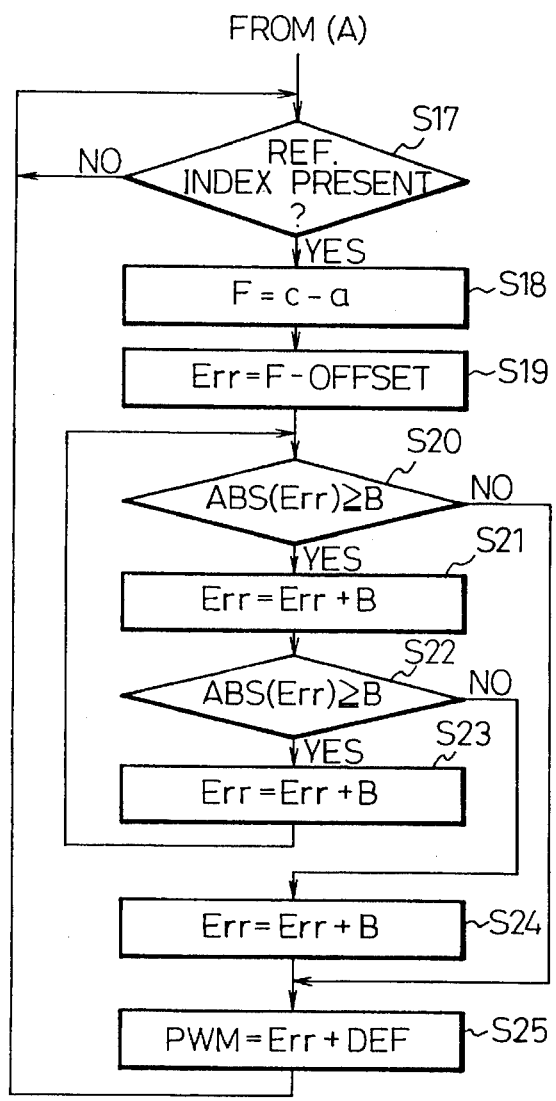

FIGS. 6(A) and 6(B) are flow charts showing the operation of the invention.

Figure 7:
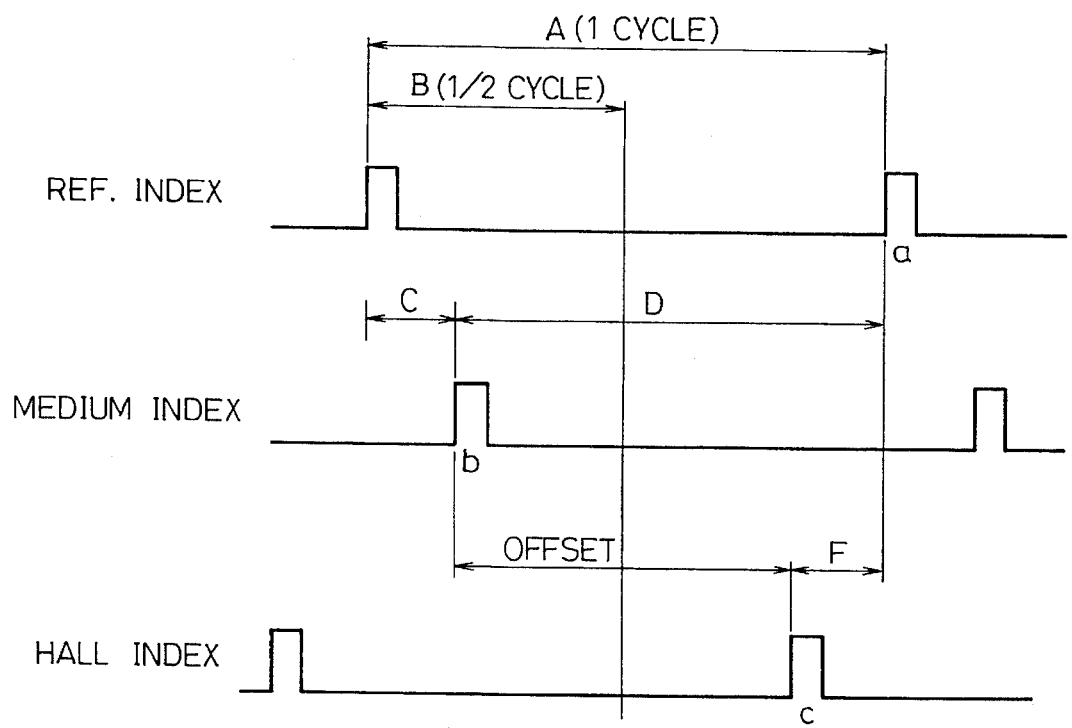
FIG. 7 is a diagram showing the phase difference of a reference index, a medium index, and a Hall index relative to one another.

FIG. 7 shows an example of the phase difference among the reference index, the medium index, and the Hall index.

Here, let it be assumed that one cycle A of the reference index is 10, a half cycle B thereof is 5, a count value a stored in the reference index register 21 is 8, a count value b stored in the medium index register 23 is 1, and a count value c stored in the Hall index register 22 is 7.

In FIG. 6(A), in Step S11, the spindle sync start commands are given to the respective magnetic disk devices 4 from the host computer 1 through the signal lines 2 when the magnetic disk drives 4 are brought into ready states thereof. The host computer 1 outputs the reference indices to the respective magnetic disk drives 4 at the same time as giving the spindle sync start commands.

In Steps S12 and S13, the processor 25 discriminates whether the medium index is present in the medium index register 23, and whether the Hall index is present in the Hall index register 22 respectively. When both the medium index and the Hall index are present, the offset value is calculated by subtracting the value b from the value c in Step S14. The offset value is 6 since c=7 and b=1 in this example. This offset value is obtained before the spindle sync is started.

In Step S15, it is discriminated whether the offset value is smaller than 0. This routine proceeds to Step S17 because the offset value is 6 in this example. If the offset value is smaller than 0, one cycle A (A=10) is added to the offset value in Step S16.

In Step S17 of FIG. 6(B), the processor 25 discriminates whether the reference index is present in the reference index register 21. If the reference index is present, the following calculation is made in Step S18: F=c−a. In this example, F=−1 since c=7 and a=8.

In Step S19, the value Err is calculated (D in FIG. 7) by subtracting the offset value from F. Err=−7 since F=−1 and the offset value=6. It will be appreciated that the value Err does not become infinite because it is defined to be a negative value.

In Step S20, it is discriminated whether an absolute value of ABS (Err) is not smaller than the half cycle B.

Since the absolute value=7 and B=5, and accordingly this routine proceeds to Step S21.

When ABS (Err)<B, the value Err is added to the current value DEF for rotating the spindle motor 7 at a constant speed A, thereby determining the PWM signal as a control value in Step S25. In this case, the spindle motor is decelerately controlled.

In Step S21, the half cycle B is added to the value Err. Here, new Err=−2 since previous Err=−7 and B=5.

In Step S22, it is discriminated whether the absolute value of Err is not smaller than the half cycle B. Here, ABS (Err)<B since ABS (Err)=2 and B=5, and this routine proceeds to Step S24.

When ABS (Err)≧B, Err+B is set as a new value Err in Step S23 and this routine returns to Step S20.

In Step S24, the half cycle B is added to the value Err to obtain a new value Err. Here, new Err (C in FIG. 7) is 3 since previous Err=−2 and B=5.

Thereafter, the current value DEF for rotating the spindle motor 7 at the fixed speed A is added to the phase difference C (Err=3) obtained in Step S25 so as to determine the PWM signal as a control value.

More specifically, the spindle motor 7 is acceleratingly controlled so as to eliminate the phase difference C when ABS (Err)≧B, thereby causing the reference index and the medium index to correspond with each other.

The Hall index is a signal generated from the spindle motor 7, and can be always input. Accordingly, even if the medium index cannot be obtained at an occurrence of an error such as a seek error, the operation of the spindle sync can be continued without being affected.

Thus, it is sufficient to execute only a re-zero operation in the event of a seek error or the like. Unlike the conventional control system, it is not required to restart the spindle sync. Therefore, a time loss can be reduced and a system is prevented from going down.

As described above, according to the invention, an offset value of a medium index relative to a Hall index is calculated before a spindle sync is started, and is stored in a memory means. The phase difference between a reference index and the medium index is obtained in a pseudo manner with reference to the stored offset value, and a spindle sync is controlled based on thus calculated phase difference. Accordingly, it is not required to restart the spindle sync in event of an error such as a seek error. Therefore, a time loss can be reduced and a system can be prevented from going down.

I claim:

1. A spindle synchronization control system for conducting a spindle synchronization control by synchronously rotating spindle motors supporting respective recording media of a plurality of storage units connected in parallel to a host computer having a reference index provided by said host computer as a reference signal, a medium index generated by reproducing each index recorded in each of said recording media, and a Hall index output from a spindle motor, said Hall index being used for detecting a phase change over time, said spindle synchronization control system including:

means for measuring a phase offset value between said Hall index and said medium index before starting said spindle synchronization control;

means for storing said thus measured phase offset value between said Hall index and said medium index;

means for measuring a phase difference between said reference index and said Hall index during said spindle synchronization control; and means for carrying out said spindle synchronization control, so that said thus measured phase difference between said reference index and said Hall index becomes equal to said thus stored phase offset value between said Hall index and said medium index.

2. A spindle synchronization control system as set forth in claim 1, further including reference index storing means for storing a count value corresponding to a time when said reference index is generated, Hall index storing means for storing a count value corresponding to a time when said Hall index is generated, and medium index storing means for storing a count value corresponding to a time when said medium index is generated.

3. A spindle synchronization control system as set forth in claim 1, wherein said storage units are a plurality of magnetic disc drives and said recording media are a plurality of disks.

4. A spindle synchronization control system for conducting a spindle synchronization control by synchronously rotating spindle motors supporting respective recording media of a plurality of storage units parallelly connected to a host computer having a reference index provided by said host computer as a reference signal, a medium index generated by reproducing each index recorded in each of said recording media, and a Hall index output from a spindle motor, said Hall index being used for detecting a phase change over time, said spindle synchronization control system including:

reference index storing means for storing a count value corresponding to a time when said reference index is generated;

Hall index storing means for storing a count value corresponding to a time when said Hall index is generated;

medium index storing means for storing a count value corresponding to a time when said medium index is generated;

discriminator means for discriminating the presence or absence of said reference index, said medium index and said Hall index;

phase offset measuring means for measuring a phase offset value difference between said Hall index and said medium index before starting said spindle synchronization control;

memory means for storing the thus measured offset value;

phase difference measuring means for measuring a phase difference between said reference index and said Hall index during said spindle synchronization control; and determination means for determining a driving control value for rotating said spindle motor wherein the thus measured phase difference between said reference index and said Hall index becomes equal to said thus stored phase offset value between said Hall index and said medium index, so that the spindle synchronization control is carried out according to the thus determined driving control value.

5. A spindle synchronization control system as set forth in claim 4, wherein said storage units are a plurality of magnetic disk drives and said recording media are a plurality of disks.

6. A spindle synchronization control system as set for in claim 4, wherein said discriminator means, said offset measuring means, said memory means, said phase difference measuring means and said determination means are realized by a processor for controlling said storage units according to a control signal supplied from said host computer.

7. A spindle synchronization control system as set forth in claim 6, wherein said memory means is comprised of a RAM which is connected to said processor and stores the offset value calculated by said processor.

* * * * *